United States Patent [19]

Trouiller et al.

[11] Patent Number: 5,268,641
[45] Date of Patent: Dec. 7, 1993

[54] LOGGING METHOD AND APPARATUS FOR MEASURING THE GRONDINGEN EFFECT-CORRECTED RESISTIVITY OF EARTH FORMATIONS

[75] Inventors: Jean-Claude Trouiller, Saint Remy les Chevreuse; Dylan Davies, Viroflay, both of France

[73] Assignee: Schlumberger Technology Corporation, Houston, Tex.

[21] Appl. No.: 7,038

[22] Filed: Jan. 21, 1993

Related U.S. Application Data

[63] Continuation of Ser. No. 757,358, Sep. 10, 1991, abandoned.

Foreign Application Priority Data

Sep. 12, 1990 [FR] France ................ 90 11254

[51] Int. Cl.⁵ .............................. G01V 3/24
[52] U.S. Cl. ..................... 324/375; 324/373
[58] Field of Search ............ 324/355, 366, 370, 371, 324/373, 374, 375

[56] References Cited

U.S. PATENT DOCUMENTS

| | | | |
|---|---|---|---|
| 3,262,050 | 7/1966 | Threadgold et al. | 324/375 |
| 3,373,349 | 3/1968 | Tanguy | 324/373 |
| 3,462,679 | 8/1969 | Attali | 324/375 |
| 3,660,755 | 5/1972 | Janssen | 324/375 |
| 3,772,589 | 11/1973 | Scholberg | 324/373 |
| 4,122,387 | 10/1978 | Ajam et al. | 324/375 |
| 4,291,267 | 9/1981 | Bonnet | 324/557 |
| 4,335,353 | 6/1982 | Lacour-Gayet | 324/373 X |
| 4,484,139 | 11/1984 | Bravenec | 324/366 |
| 4,524,325 | 6/1985 | Moore et al. | 324/375 |
| 4,646,026 | 2/1987 | Chemali et al. | 324/375 X |
| 4,659,993 | 4/1987 | Womack | 324/375 |

*Primary Examiner*—Gerard R. Strecker
*Attorney, Agent, or Firm*—Henry N. Garrana; John H. Bouchard

[57] ABSTRACT

A logging method for measuring the resistivity of formations having a borehole passing therethrough, in which a logging sonde is suspended inside the borehole by means of a cable, the sonde comprising electrodes for injecting alternating currents into the formations, these electrodes comprising a central electrode $A_0$ and focusing electrodes, together with a return electrode B and a potential reference electrode N, one of which is placed above the sonde and the other of which is placed at the surface, and producing a resistivity log from the current $I_0$ emitted by the central electrode and the potential difference between the sonde and the reference electrode. The method further comprises the step of producing a second log of the resistivity with the return and potential reference electrodes being placed as for the first log and under conditions such that the investigation depth is different from that applicable to the first log. The invention is applicable to correcting the Groningen effect.

10 Claims, 3 Drawing Sheets

FIG_1

LOGGING METHOD AND APPARATUS FOR MEASURING THE GRONDINGEN EFFECT-CORRECTED RESISTIVITY OF EARTH FORMATIONS

This is a continuation of Ser. No. 757,358 filed Sep. 10, 1991, now abandoned.

BACKGROUND OF THE INVENTION

The present invention relates to a method and apparatus for measuring the resistivity of formations having a borehole passing therethrough, and is particularly applicable to the error-prone situation of measuring the resistivity of a conducting layer situated beneath a layer of high resistivity and of considerable thickness, with the bottom end or "shoe" of the casing being situated at the bottom of the thick layer.

Conventional apparatus for resistivity logging is Schlumberger's Dual Laterolog (DLT) described in particular in U.S. Pat. Nos. 3,772,589 (Scholberg) and 4,291,267 (Bonnet). This apparatus comprises a sonde suspended from an electric cable by means of an insulating cable, with the sonde having an elongate shape suitable for displacement inside boreholes. The sonde includes a central electrode $A_0$ emitting a current $I_0$ into the formation, and focusing electrodes ($A_1$, $A'_1$ and $A_2$, $A'_2$) disposed symmetrically on either side of the central electrode and intended to produce focussing currents which ensure that the radial penetration of the current $I_0$ into the formation is appropriate. The sonde also includes one or more potential-measuring electrodes M placed between the electrodes $A_0$ and $A_1$ or $A'_1$. In addition to the sonde, the apparatus includes a reference potential electrode N situated on the insulating cable or at its top end where it joins the electric cable, and a current return electrode B placed on the surface. The resistivity value provided by this apparatus is the apparent resistivity:

$$R_a = K(V_M - V_N)/I_0$$

where K is a constant called the geometric factor, $V_M$ is the potential of the sonde as measured using the electrodes M, $V_N$ is the reference potential, and $I_0$ is the current emitted by the electrode $A_0$.

In the above-mentioned apparatus, the emitted current is an alternating current. In order to obtain measurements simultaneously at different investigation depths, two different frequencies are used: a low frequency (35 Hz) for the deeper measurement called LLd; and a higher frequency (280 Hz) for the shallower measurement called LLs. However the present description relates only to the deeper measurement which is the only one requiring a return electrode on the surface.

Under special conditions, the measurement of the resistivity of a formation is subject to an error known as the Groningen effect. Reference may be made to US Pat. No. 4,335,353 (Lacour-Gayet) on this subject. This effect occurs when a layer of great thickness and high resistivity lies over a more conductive formation whose resistivity is to be evaluated. It can be explained by two factors.

Firstly, current is transferred between the formation and the conducting armor of the cable. According to transmission line theory, this transfer to the core of the cable takes place over a characteristic length ($L_c$) given by $L_c = (R_s/R_c)^{\frac{1}{2}}$, where $R_s$ is the resistivity of the formation situated around the cable core, and $R_c$ is the resistance of the cable per unit length. It can be seen that the characteristic length $L_c$ is long if the resistivity $R_s$ of the formation around the core is high. In practice, the presence of the core has the effect of deforming equipotential surfaces so that instead of being orthogonal to the borehole, they slope towards it. As a result, the potential of the reference electrode N, instead of being equal to the potential of a zone of formation situated at the same level as and at a significant distance from the borehole in a radial direction, actually corresponds to the potential at a shallower level (i.e. a level closer to the surface), offset by a length Lc relative to the level of the reference electrode.

Secondly, current lines going towards the surface are concentrated by the skin effect into a cylinder centered on the cable. This cylinder is analogous to a coaxial cable and has a resistance $R_e$ per unit length which is independent of the resistivity of the formation. This results in a drop in potential per unit length of $\Delta V = R_e \cdot /I_T$ where $I_T$ is the total current emitted by the apparatus. Since the length to be taken into consideration is the above-mentioned characteristic length $L_c$, the error in the reference potential is:

$$\Delta V/L_c = R_e/I_T/(R_s/R_c)^{\frac{1}{2}}$$

and the resulting measurement error is $$\Delta R_a = K/R_e/(I_T/I_0)/(R_s/R_c)^{\frac{1}{2}}$$

using typical values for the various parameters, this gives $$\Delta R_a \approx 0.01\, R_s^{\frac{1}{2}}$$

It is observed that the error may become considerable when the resistivity $R_s$ of the layer surrounding the reference electrode N is high. The error is of the order of 1 ohm-m for a resistivity $R_s$ of the order of 10000 ohm-m. Consequently, if the formation at the sonde is conductive (e.g. if its apparent resistivity $R_a$ is of the order of 1 ohm-m), then a very large relative error $\Delta R_a/R_a$ occurs.

Above-mentioned U.S. Pat. No. 4,335,353 describes a technique for correcting this error based on measuring the component of the potential that is in quadrature relative to the total current $I_T$. This method gives satisfaction so long as the high resistivity layer is situated far away from the cased section of the borehole.

However, this method is inadequate when the borehole includes a cased section and the casing shoe (i.e. the bottom end thereof) is situated over the boundary between the conducting layer and the high resistivity layer. Under such circumstances, because of the skin effect in the tubing (generally made of steel), and therefore highly conductive, the current emitted by the measurement device is concentrated in a thin (a few millimeters thick) portion of the casing wall, on the inside of the casing and with a high current gradient occurring towards the casing shoe which then acts as the return electrode instead of the electrode on the surface. This gives rise to an error in the reference potential which may be ten to twenty times greater than the error that would occur in the absence of any casing.

One object of the invention is to provide a technique capable of correcting the error relating to the reference potential, including under the difficult circumstances of the casing shoe being situated at the bottom of the high resistivity layer.

SUMMARY OF THE INVENTION

According to the method of the invention, a second log of the resistivity is produced, with the return and potential reference electrodes being placed as for the first log and under conditions such that, other things being equal, the investigation depth is different from that applicable to the first log.

Two relatively independent measurement values are thus obtained for the formations under conditions which are otherwise identical, and from these measurements it is possible to determine the corrections that needs to be applied to the reference potential $V_N$.

The invention also provides logging apparatus of the above-specified type that includes means for changing the investigation depth of the sonde.

These means preferably consist in providing a top conducting portion adjacent to the end of the electrode A2 furthest from the central electrode $A_0$, which top conducting portion is connected to the electrode $A_2$ by an insulating connection capable of being short circuited.

BRIEF DESCRIPTION OF THE DRAWINGS

The invention will be better understood from reading the following detailed description made with reference to the drawings. In the drawings.

DETAILED DESCRIPTION OF THE INVENTION

Figure 1:
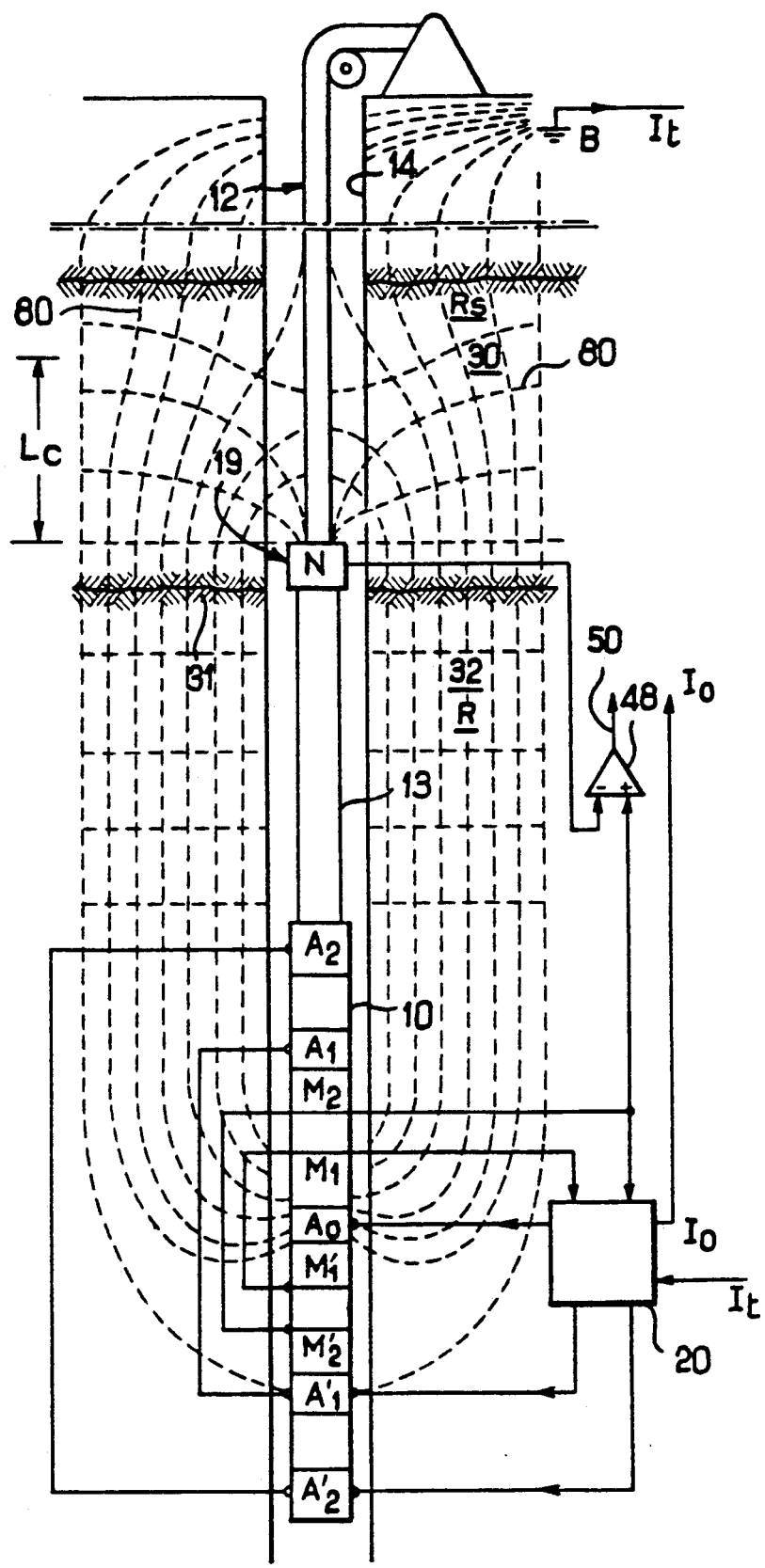
FIG. 1 is a diagram of a Dual Laterolog type logging system.

FIG. 1 shows a logging system including a laterolog type apparatus. This apparatus comprises a sonde 10 suspended from a cable 12 in a borehole 14. The sonde is connected to the cable 12 by an insulating cable "bridle" 13.

The sonde 10 is described in above-mentioned U.S. Pat. No. 4,291,267 and reference should be made thereto for detailed information. The sonde comprises a series of electrodes constituted by conducting rings disposed along an insulating mandrel: a central electrode $A_0$ launches the current, two pairs of focusing electrodes $A_1$-$A'_1$ and $A_2$-$A'_2$ are disposed symmetrically on either side of the central electrode $A_0$, and two pairs of monitor electrodes $M_1$-$M'_1$ and $M_2$-$M'_2$ are placed between the central electrode $A_0$ and the pair of electrodes $A_1$-$A'_1$ which are likewise disposed symmetrically on either side of the electrode $A_0$. The electrodes in any given pair are interconnected by electrical connections. The voltage between the focusing pair of electrodes $A_1$-$A'_1$ and the electrode $A_0$ is adjusted by means of a control circuit 20 so as to maintain the voltage between the pairs of monitor electrodes $M_1$-$M'_1$ and $M_2$-$M'_2$ close to zero, and in addition the pair of electrodes $A_2$-$A'_2$ is placed at the same potential as the pair of electrodes $A_1$-$A'_1$. This forces the current $I_0$ emitted by the electrode $A_0$ to penetrate into the formation in a direction perpendicular to the axis of the sonde so that the investigation depth of the current enables it to reach the non-invaded zone of the formation. The currents that are emitted are low frequency alternating currents, with the sonde operating, in practice, at two different frequencies which correspond to modes of investigation for different depths. For deep mode, the frequency is low (35 Hz). Current return takes place via an electrode B placed at the surface. Shallow mode, which does not apply to the present invention, takes place at a higher frequency, with current return via the electrodes $A_2$-$A'_2$, and in this case these electrodes are not put at the same potential as the electrodes $A_1$-$A'_1$.

In deep mode, a resistivity value called the "apparent" resistivity $R_a$ is obtained as described above by taking the ratio of the potential difference between the sonde 10 and the reference electrode N (19) divided by the current $I_0$ emitted by the central electrode $A_0$.

$$R_a = K(V_M - V_N)/I_0$$

where $V_M$ is the potential taken from a monitor electrode such as $M_2$;

$V_N$ is the reference potential taken from electrode N; and K is a constant called the geometric factor which depends on the geometry.

As described above, the reference potential $V_N$ may be subject to significant error under some conditions, referenced to as the Groningen effect. FIG. 1 illustrates these conditions. A thick layer 30 of high resistivity $R_S$ follows a low resistivity layer 32. The error occurs when the reference electrode 19 is close to the boundary 31 between the layers 30 and 32. FIG. 1 shows how the current lines 80 in the resistive layer 30 are distorted and the effect this has on the reference potential. Overall, the reference potential is subjected to an error $V_N$ proportional to the total current $I_T$:

$$\Delta V_N = G/I_T$$

As a result, the value obtained for the apparent resistivity is increased by a quantity:

$$\Delta R = K/G/(I_T/I_0)$$

where G represents the Groningen effect at the depth under consideration, said effect being the function of the characteristics of the apparatus for logging the formations through which the borehole passes, and of the borehole itself (whether or not it has casing and position relative to the casing shoe, and resistivity of the drilling fluid).

Figure 2:
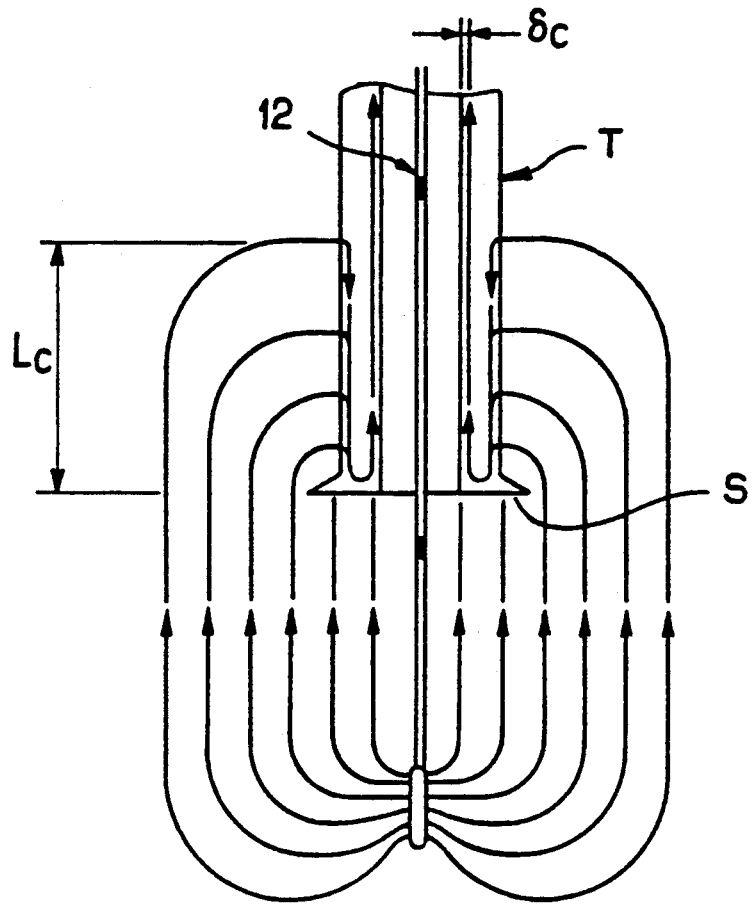
FIG. 2 shows current lines under conditions that give rise to the Groningen effect in the presence of casing.

In the presence of casing having its shoe situated over the boundary 31 between the layers 30 and 32, the current lines are concentrated over the inside wall of the tubing because of the skin effect, as shown in FIG. 2, with current being concentrated in a thin portion (typically 2.7 mm thick) of the wall. As a result, all of the current lines converge on the casing shoe and it takes the place of the surface electrode B with respect to current return.

In this situation, the Groningen effect can become 10 to 20 times greater than it would be if there were no casing, and it may give rise to an error that is of the same order of magnitude as the resistivity value to be measured.

In order to evaluate this effect once it has been shown up by examining a log, and in order to correct the resistivity values accordingly, a second measurement pass is performed in the corresponding portion of the borehole by means of logging apparatus which continues to use a surface current return, but which is modified with respect to its investigation depth. Two distinct resistivity measurements are thus obtained at each level, thereby providing two relatively independent equations having the resistivity $R_a$ and the Groningen effect G as unknowns. The resistivity $R_a$ can be determined from these equations including corrections for the Groningen effect.

In mathematical terms, this method is expressed as follows. Using the above notation, the apparent resistivity is:

$$R_a = K(V_M - V_N)/I_0$$

The error on the reference potential due to the Groningen effect is:

$$\Delta V_N = G/I_T$$

The apparent resistivity is thus subject to an error $$R = K/G/(I_T/I_0)$$

i.e., using the conventional notation:

$$LLd = R_a + K/G/(I_T/I_0)$$

where LLd is the measurement provided by a Laterolog sonde in deep mode.

The second measurement pass takes place using modified apparatus having different values for the constant K relating to the geometry of the sonde, and for the ratio $I_T/I_0$ of the total current divided by the measurement current. With respect to these quantities, it may be observed that the constant K is known for a sonde of given geometry, and the ratio $I_T/I_0$ is determined on the basis of measurements relating to the operation of the sonde. If the values relating to the second pass are given a prime symbol ' then:

$$LLd = R'_a + K'/G(I_T/I_0)'$$

Finally, since the apparent resistivities $R'_a$ and $R_a$ correspond to different investigation depths, they have different values under identical conditions. These values are linked by the relationship:

$$R'_a = C/R_a$$

where the coefficient C is obtained using correction charts on the basis of the measurement LLd and LLs (shallow laterolog) provided by the sonde and on the basis of a shallow resistivity measurement $R_{xo}$ provided, for example, by a microresistivity sonde of the Schlumberger SRT sonde type.

$$R_a = LLd - \frac{(LLd'/C) - LLd}{\alpha - 1} \text{ where } \alpha = \frac{K'(I_T/I_0)'}{CK(I_T/I_0)}$$

The calculation is performed by iteration, using an initial value for the coefficient C corresponding to no Groningen effect, i.e. corresponding to G=0.

In an advantageous implementation, the investigation depth of the sonde is obtained by changing the effective length of at least one of the electrodes $A_2$.

Figure 3:
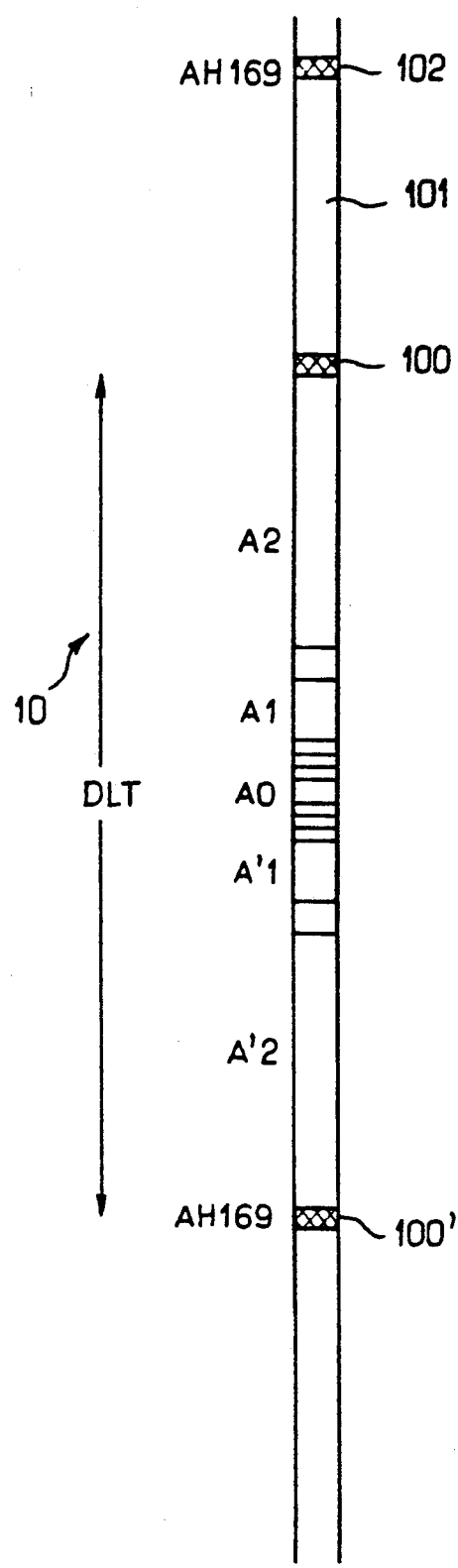
FIG. 3 shows a first embodiment of logging apparatus of the invention.

FIG. 3 shows an embodiment of logging apparatus capable of obtaining such a change. The portion 10 encompassed by the arrows corresponds to a Schlumberger Dual Laterolog (DLT) sonde as used commercially. The shaded portions are current electrodes: the central electrode $A_0$, and the focusing electrodes $A_1-A'_1$ and $A_2-A'_2$ which are insulated from one another. Two insulating connections 100 and 100' are provided, preferably of the type corresponding to Schlumberger reference AH169 and disposed adjacent to respective ones of the electrodes $A_2-A'_2$ on their sides furthest from the central electrode, thereby isolating the electrodes $A_2-A'_2$ from other portions of the apparatus. The portion 101 following the insulating connection 100 adjacent to the top electrode $A_2$ is electrically conductive (at least over its outside surface) and is itself insulated at its top end by an insulating connection 102, which is preferably of the above-mentioned AH169 type. The connection 100 is capable of being short circuited to establish an electrical connection between the top electrode $A_2$ and the conducting portion 101. If the connection 100 is short circuited in this way, then the portion 101 emits a current like the electrode $A_2$ and the effective length of the focusing electrode is increased by the length of the portion 101. Other things being equal, the quantity $K/(I_T/I_0)$ as defined above is thus changed compared with the situation where the connection 100 is effectively insulating.

The conducting portion 101 may be constituted by a logging sonde of a different type, capable of acting as a current electrode. For example, it may be a Schlumberger SRT microresistivity sonde as is conventionally associated with a DLT sonde in logging apparatus for providing a measure of the resistivity $R_{xo}$ in the so-called "invaded" zone (measurements performed at a shallow investigation depth). In this particular case, the effective length of the electrode $A_2$ is multiplied by a factor of about 2.5.

In practice, if an anomaly is detected after performing an operation using a sonde 10 of the above-mentioned type, which anomaly is shown up by resistivity values that are clearly too high, then the connection 100 is short circuited and the apparatus is lowered back down the borehole to perform a log, at least over that portion of the borehole to which the anomaly applies.

Figure 4:
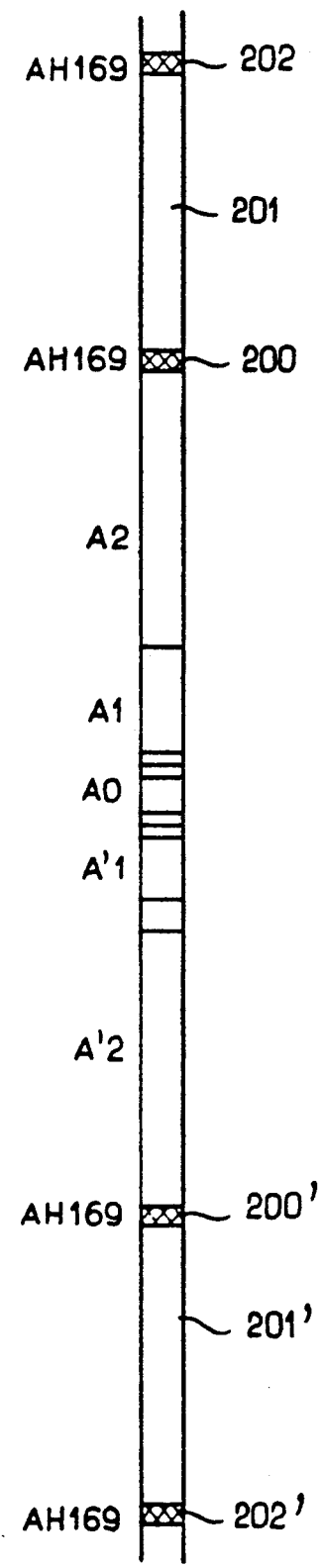
FIG. 4 shows a second embodiment of the invention.

The embodiment of FIG. 3 introduces asymmetry in apparatus which is normally symmetrical. A variant shown in FIG. 4 re-establishes symmetry by providing conducting portions 201 and 201, on opposite sides of the electrodes $A_2$, with the conducting portions 201 and 201' extending respectively between insulating connections 200 & 202 and between insulating connections 200' & 202'.

The invention is not limited to the embodiments described above.

Thus, the second log may be performed simultaneously with the first instead of performing two successive operations. For simultaneous performance, apparatus such as that shown in FIG. 3 may be provided together with control means for alternately establishing and interrupting the electrical connection between the electrode $A_2$ and the conducting portion 101, short circuiting the insulating connection 100.

In addition, the invention is applicable not only to the embodiments described including a surface return electrode B and a potential electrode reference N above the sonde, but also to the dual disposition comprising a potential reference electrode at the surface and a return electrode above the sonde.

We claim:

1. A logging method for measuring the Groningen effect-corrected resistivity of a formation having a borehole passing therethrough, comprising the steps of:
   suspending a logging sonde inside the borehole by means of a cable, the sonde comprising a central electrode, focusing electrodes and monitor electrodes while providing a return electrode and a reference electrode disposed so that one of them is above the sonde and the other is at the surface;
   injecting alternating currents into the formation, between (i) said central and focusing electrodes and (ii) said return electrode;
   detecting the potential difference between said monitor electrodes and said reference electrode;
   producing first signals representative of the formation resistivity at a plurality of borehole levels from a first current emitted by the central electrode and a first potential difference detected between the sonde and said reference electrode;
   changing the investigation depth of said sonde;
   after changing the investigation depth of said sonde, producing second signals representative of the formation resistivity at said plurality of borehole levels from a second current emitted by said central electrode and a second potential difference detected between the sonde and said reference electrode, said second signals having a different sensitivity to the Groningen effect than said first signals; and
   combining said first and second signals at each of said levels to produce resistivity signals corrected for the Groningen effect.

2. A logging method for measuring the Groningen effect-corrected resistivity of a formation having a borehole passing therethrough, comprising the steps of:
   suspending a logging sonde inside the borehole by means of a cable, the sonde comprising a central electrode, focusing electrodes and monitor electrodes while providing a return electrode and a reference electrode disposed so that one of them is above the sonde and the other is at the surface;
   injecting alternating currents into the formation, between (i) said central and focusing electrodes and (ii) said return electrode;
   detecting the potential difference between said monitor electrodes and said reference electrode;
   producing first signals representative of the formation resistivity at a plurality of borehole levels from a first current emitted by the central electrode and a first potential difference detected between the sonde and said reference electrode; and
   after changing the product $K(I_T/I_O)$, where K is a geometric factor relating to the sonde and $I_T/I_O$ is the ratio of the total current $I_T$ emitted by the sonde divided by the current $I_O$ emitted by the central electrode, producing second signals representative of the formation resistivity at a plurality of borehole levels from a second current emitted by said central electrode and a second potential difference detected between the sonde and said reference electrode, said second signals having a different sensitivity to the Groningen effect than said first signals; and
   combining said first and second signals at each of said levels to produce resistivity signals corrected for the Groningen effect.

3. A method according to claim 1, in which said step of changing the investigation depth comprises changing the length of at least one of said focusing electrodes.

4. A method according to claim 1, in which said step of changing the investigation depth comprises symmetrically changing the length of two focusing electrodes placed on either side of said current electrode.

5. A logging apparatus for measuring the Groningen effect-corrected resistivity of a formation having a borehole passing therethrough, comprising:
   a logging sonde adapted to be moved along the borehole and suspended from an electric cable, the sonde comprising a central electrode, focusing electrodes and monitor electrodes;
   a return electrode and a reference electrode being disposed so that one of them is above the sonde and the other is at the surface;
   means for changing the investigation depth of the sonde between a first and a second investigation depth;
   means for injecting first and second alternating currents into the formation between (i) said central and focusing electrode and (ii) said return electrode for said first and second investigation depth respectively;
   means for detecting first and second potential differences between one of said monitor electrode and said reference electrode for said first and second investigation depths respectively; and
   means for producing first resistivity signals in response to said first alternating current and said first potential difference and for producing second resistivity signals, having a different sensitivity to the Groningen effect than said first signals, in response to said second alternating current and said second potential difference whereby resistivity signals corrected for the Groningen effect can be produced.

6. A logging apparatus for measuring the Groningen effect-corrected resistivity of a formation having a borehole passing therethrough, comprising:
   a logging sonde adapted to be moved along the borehole and suspended from an electric cable, the sonde comprising a central electrode, focusing electrodes and monitor electrodes;
   a return electrode and a reference electrode being disposed so that one of them is above the sonde and the other is at the surface;
   means for changing the product $K(I_T/I_O)$ between first and second values, where K is a geometric factor relating to the sonde and $I_T/I_O$ is the ratio of total current $I_T$ emitted by the sonde divided by the current $I_O$ emitted by the central electrode;
   means for injecting first and second alternating currents into the formations between (i) said central and focusing electrodes and (ii) said return electrode for said first and second values of the product $K(I_T/I_O)$ respectively;
   means for detecting first and second potential differences between one of said monitor electrodes and said reference electrode for said first and second values of the product $K(I_T/I_O)$ respectively; and
   means for producing first resistivity signals in response to said first alternating current and said first potential difference and for producing second resistivity signals, having a different sensitivity to the Groningen effect than said first signals, in response to said second alternating current and said second potential difference whereby resistivity signals corrected for the Groningen effect can be produced.

7. Apparatus according to claim 6, including means for changing the length of at least one of said focusing electrodes.

8. A device according to claim 7, in which said length changing means include a conducting portion placed adjacent to the focusing electrode on its side furthest from the current electrode, and an insulating connection capable of being short circuited and placed between said focusing electrode and said conducting portion.

9. Apparatus according to claim 8, in which said conducting portion is constituted by a microresistivity sonde.

10. A logging apparatus for measuring the Groningen effect-corrected resistivity of a formation having a borehole passing therethrough, comprising:
  a logging sonde adapted to be moved along the borehole and suspended from an electric cable, the sonde comprising a central electrode, focusing electrodes and monitor electrodes, one of said focusing electrodes having first and second conducting portions and an insulating connection capable of being short circuited and placed between said first and second conducting portions;
  means connected to said first and second conducting portions for short-circuiting said first and second conducting portions;
  a return electrode and a reference electrode being disposed so that one of them is supported by said cable above the sonde and the other is at the surface;
  means for injecting a first alternating current into the formation between (i) said central electrode and the first portion of said focusing electrodes and (ii) said return electrode, and for injecting a second alternating current into the formation between (i) said central electrode and said short-circuited first and second portions of said focusing electrodes and (ii) said return electrode;
  means for detecting first and second potential differences between said monitor electrodes and said reference electrode when said first and second currents are injected respectively; and
  means for producing first signals representative of formation resistivity in response to said first alternating current and said first potential difference and for producing second signals representative of formation resistivity in response to said second alternating current and said second potential difference whereby processing of said first and second resistivity signals can produce a resistivity signal corrected for the Groningen effect.

* * * * *